(12) United States Patent
Scheuer

(10) Patent No.: US 9,957,410 B2
(45) Date of Patent: May 1, 2018

(54) COATED REINFORCEMENT AND METHOD FOR PRODUCING SAME

(75) Inventor: Christoph Scheuer, Dinslaken (DE)

(73) Assignee: HEXION INC., Columbus, OH (US)

( * ) Notice: Subject to any disclaimer, the term of this patent is extended or adjusted under 35 U.S.C. 154(b) by 1712 days.

(21) Appl. No.: 13/131,217

(22) PCT Filed: Nov. 25, 2009

(86) PCT No.: PCT/EP2009/008389
§ 371 (c)(1),
(2), (4) Date: Aug. 31, 2011

(87) PCT Pub. No.: WO2010/060611
PCT Pub. Date: Jun. 3, 2010

(65) Prior Publication Data
US 2011/0305907 A1   Dec. 15, 2011

(30) Foreign Application Priority Data

Nov. 26, 2008 (EP) .................................. 08020509

(51) Int. Cl.
*C09D 163/00* (2006.01)
*C08J 7/04* (2006.01)
*D06N 3/12* (2006.01)

(52) U.S. Cl.
CPC ............ *C09D 163/00* (2013.01); *C08J 7/047* (2013.01); *D06N 3/12* (2013.01); *C08J 2463/00* (2013.01); *Y02E 10/721* (2013.01); *Y10T 428/31515* (2015.04)

(58) Field of Classification Search
CPC ................................. B05D 3/02; B32B 27/38
USPC ...................................................... 427/385.5
See application file for complete search history.

(56) References Cited

U.S. PATENT DOCUMENTS

| 3,470,132 A | * | 9/1969 | Ernst | C07C 51/567 525/533 |
| 4,252,593 A | * | 2/1981 | Green | C08F 283/10 156/182 |
| 5,008,335 A | * | 4/1991 | Pettit, Jr. | C08G 59/38 525/111 |

FOREIGN PATENT DOCUMENTS

| JP | 2004099814 | 4/2004 |
| WO | WO 2006/043019 | 4/2006 |
| WO | WO 2008/104822 | 9/2008 |

OTHER PUBLICATIONS

Weinmann et al. Amine-Functional curatives for low temperature cure Epoxy coatings, Resolution.*
Osamu Hara, Curing Agents for Epoxy Resin, Dec. 20, 1990, Three Bond Technical New, 32, 1-10.*

* cited by examiner

*Primary Examiner* — Dah-Wei D. Yuan
*Assistant Examiner* — Hai Y Zhang

(57) ABSTRACT

The invention relates to a coated reinforcement, to a method for producing the same and to the use thereof. In order to provide a coated reinforcement, in particular to be used for large surface area components, the coating of which can be applied easily and without difficultly substantially independently of the processing-relevant properties of the components of the resin mixture, it is proposed that the surface of the reinforcement has a coating made of a composition, the composition contains a mixture 1 of at least one resin, selected from the group consisting of epoxidized phenol novolacs, epoxidized cresol novolacs, polyepoxides based on bisphenol A, epoxidized fluorenone bisphenols and/or polyepoxides bases on bisphenol-F, and/or based on triglycidyl isocyanurates, epoxidized novolac and at least one component that accelerates the curing of the resin, and said mixture is subjected to a heat treatment, so that the mixture 1 is affixed to the surface of the reinforcement by fusing it thereon.

12 Claims, No Drawings

COATED REINFORCEMENT AND METHOD FOR PRODUCING SAME

RELATED APPLICATION DATA

This application claims the benefit of PCT Application PCT/EP2009/008389 with International Filing Date of Nov. 25, 2009, published as WO 2010/060611 A1, which further claims priority to European Patent Application No. 08020509.9 filed Nov. 26 2008, the entire contents of both are hereby incorporated by reference.

DETAILED DESCRIPTION

The invention relates to a coated reinforcement, a method for its production and use.

If reinforcements are to be coated with a thermoset resin, there are various requirements that must be taken into account in terms of the reinforcement and of the resin. For instance, it is to be possible to coat the reinforcement without complication and in as short a time as possible. However, there are barriers to the conventional techniques for the coating of reinforcements, since the mixture composition of at least resin, curative, and accelerator imposes technical limits on processing, in terms of temperature and time.

Conventionally, reinforcements, more particularly for the production of components of large surface area, such as, for example, for blades for wind turbines or for marine construction, can be coated in hand lamination, in prepreg technology or else by means of an infusion technique. A disadvantage of all of these methods is that the provision of the resin mixture, generally a resin/curative mixture, necessitates a mixing and metering device. This device must ensure that the resin mixture is produced in consistent quality. Moreover, no excess quantity of resin mixture needed for the production, for example, of a wind blade can be prepared, since the short pot life of the resin/curative mixture does not allow this. A further disadvantage is that, owing to the high reactivity of the resin/curative mixtures used, associated with the long time involved in injection, there is frequently an inhomogeneous gelling produced, which results in increased mechanical stresses in the finished component.

It is therefore necessary to provide a large number of relatively small batches, and this necessitates continual monitoring of the mixing and metering device.

Furthermore, the mixtures used must also be adapted to the outside temperatures of the large production halls, and so different mixtures have to be used as a function of the season.

It is an object of the present invention now to provide coated reinforcements, more particularly for use for components of large surface area, with a coating which can be applied easily and without complication and substantially independently of the processing-relevant circumstances governing the components of the resin mixture.

This object is achieved in that the surface of the reinforcement has a coating of a composition, which comprises a mixture 1 of at least one resin selected from the group consisting of epoxidized phenol novolaks, epoxidized cresol novolaks, polyepoxides on the basis of bisphenol A, epoxidized fluorenebisphenols (e.g., polyepoxides on the basis of tetrabromobisphenol A) and/or polyepoxides on the basis of bisphenol F and/or on the basis of triglycidyl isocyanurates and/or epoxidized novolak, and at least one component accelerating the curing of the resin, and this mixture is subjected to a heat treatment, and so the mixture 1 is fixed on the surface of the reinforcement by melting.

The reinforcement of the invention is coated with an easily preparable mixture of resin and accelerator. The composition may be applied conventionally, in the form, for example, of scattering, spraying, spreading, knifecoating or by means of an infusion technique. In accordance with the resin components used, the temperature (around 40-150° C.) of the heat treatment is selected such that a film of the melted composition remains on the surface of the reinforcement. The melting of the composition is a thermal reforming procedure in which there is no chemical reaction and also no crosslinking.

The composition is stable on storage, and can therefore be premixed and used as and when required. A further advantage is that the coated reinforcement too is stable on storage, and so can be supplied in prefabricated form to the further production site. Moreover, the coating increases the drapability and enhances the cutting-to-size of the reinforcement.

The reinforcements may be used in the form of fibers, scrims, nonwovens, knits or wovens and may be fabricated from glass, ceramic, boron, basalt and/or carbon and/or synthetic (e.g., aramid) or natural (e.g., flax, cotton fibers, cellulose, hemp, sisal) polymers.

Use is made as resin component of epoxidized phenol novolaks (condensation product of phenol and, for example, formaldehyde and/or glyoxal), epoxidized cresol novolaks, polyepoxides on the basis of bisphenol A (including, for example, product of bisphenol A and tetraglycidylmethylenediamine), epoxidized fluorenonebisphenols (e.g., polyepoxides on the basis of tetrabromobisphenol A) and/or polyepoxides on the basis of bisphenol F and/or epoxidized novolak, and/or epoxy resins based on triglycidyl isocyanurates.

The average molecular weight of all of these resins is preferably ≥600 g/mol, since they are then solid resins, which can be applied by scattering. They include the following:

Epikote® 1001, Epikote® 1004, Epikote® 1007, Epikote® 1009: polyepoxides based on bisphenol A, Epon® SU8 (epoxidized bisphenol A novolak), Epon® 1031 (epoxidized glyoxal phenol novolak), Epon® 1163 (polyepoxide based on tetrabromobisphenol A), Epikote® 03243/LV (polyepoxide based on (3,4-epoxycyclohexyl)methyl 3,4-epoxycyclohexylcarboxylate and bisphenol A), Epon® 164 (epoxidized o-cresol novolak)—all products available from Hexion Specialty Chemicals, Inc.

The advantage of these resins used is that they are storable and grindable at room temperature. They are meltable at moderate temperatures and can be crosslinked with the curative present in mixture 2.

Examples of accelerating components employed include imidazoles, substituted imidazoles, imidazole adducts, imidazole complexes (e.g., Ni-imidazole complex), tertiary amines, quaternary ammonium and/or phosphonium compounds, tin(IV) chloride, dicyandiamide, salicylic acid, urea, urea derivatives, boron trifluoride complexes, boron trichloride complexes, epoxy addition reaction products, tetraphenylene-boron complexes, amine borates, amine titanates, metal acetylacetonates, naphthenic metal salts, octanoic metal salts, tin octoates, further metal salts and/or metal chelates.

At this point, mention may additionally be made, by way of example, of the following: oligomeric polyethylenepiperazines, dimethylaminopropyldipropanolamine, bis(dimethylaminopropyl)amino-2-propanol, N,N'-bis(3-dimethylaminopropyl)urea, mixtures of N-(2-hydroxypropyl) imidazole, dimethyl-2-(2-aminoethoxy)ethanol and mixtures thereof, bis(2-dimethylaminoethyl) ether, pentamethyldiethylenetriamine, dimorpholinodiethyl ether, 1,8-diazabicyclo[5.4.0]undec-7-ene, N-methylimidazole, 1,2-dimethylimidazole, triethylenediamine.

Together with the resins listed above, the accelerators produce solid, free-flowing and scatterable mixtures which at room temperature possess a sufficient to outstanding storage stability.

It is additionally of advantage if the fixed mixture 1 of the reinforcement carries an applied mixture 2, the mixture 2 being at least one resin selected from the group consisting of polyepoxides on the basis of bisphenol A and/or F, on the basis of tetraglycidylmethylenediamine (TGMDA), on the basis of epoxidized fluorenonebisphenols (e.g., tetrabromobisphenol A) and/or epoxidized novolak and/or polyepoxide esters on the basis of phthalic acid, hexahydrophthalic acid or on the basis of terephthalic acid, epoxidized o- or p-aminophenols, epoxidized polyaddition products of dicyclopentadiene and phenol, diglycidyl ethers of the bisphenols, more particularly of bisphenols A and F and/or advancement resins prepared therefrom, and comprising at least one anhydride curative and/or amine curative, and this assembly is cured with heating. The epoxide equivalent weight of the resins is preferably 170-450 g.

Mention may also be made at this point, by way of example, of
2,2-bis[3,5-dibromo-4-(2,3-epoxypropoxy)phenyl]propane,
2,2-bis[4-(2,3-epoxypropoxy)cyclohexyl]propane,
4-epoxyethyl-1,2-epoxycyclohexane or
3,4-epoxycyclohexyl 3,4-epoxycyclohexanecarboxylate [2386-87-0].
These mixtures are preferably liquid, in order to ensure ease of injection.

As a result of the simple application, not associated with any processing difficulties, of the resin/curative mixture, a reinforcement is ultimately achieved which meets the challenges involved in the production and use in fiber-reinforced plastics, such as, for example, in rotor blades for wind turbines, in aircraft and vehicle technology, and in marine construction.

A dicarboxylic anhydride or a modified dicarboxylic anhydride is to be used with preference as the anhydride curative of the mixture 2. Examples that may be mentioned at this point include the following anhydrides: tetrahydrophthalic anhydride (THPA), hexahydrophthalic anhydride (HHPA), methyltetrahydrophthalic anhydride (MTHPA), methylhexahydrophthalic anhydride (MHHPA), methylnadic anhydride (MNA), dodecenylsuccinic anhydride (DSA) or mixtures thereof. Modified dicarboxylic anhydrides employed include acidic esters (reaction products of abovementioned anhydrides or mixtures thereof with diols or polyols, e.g.: neopentylglycol (NPG), polypropylene glycol (PPG), preferably molecular weight 200 to 1000). Through deliberate modification it is possible to set a further range of the glass transition temperature (between 30 and 200° C.).

Furthermore, the curatives may be selected from the group of the amine curatives, in turn selected from the polyamines (aliphatic, cycloaliphatic or aromatic), polyamides, Mannich bases, polyaminoimidazoline, polyetheramines, and mixtures thereof. Mention may be made at this point, by way of example, of the polyetheramines, e.g., Jeffamine D230, D400 (from Huntsman), which are distinguished by a low level of exothermy. The polyamines, e.g., isophoronediamine, possess a high Tg value, and the Mannich bases, e.g., Epikure 110 (Hexion Specialty Chemicals, Inc.), are notable for low formation of carbamate and for a high reactivity.

The resins used for mixture 2 may be identical to the resins of the mixture 1. It is, however, also possible to use a different resin for mixture 2 than for mixture 1.

The assembly composed of the reinforcement coated with mixtures 1 and 2 is cured under conventional conditions with heating at around 40-200° C., preferably 80-120° C.

Additionally provided in accordance with the invention is a method for producing a coated reinforcement whose surface has a coating of a heat-curable composition, wherein a mixture 1 of at least one resin selected from expoxidized phenol novolaks, epoxidized cresol novolaks, polyepoxides on the basis of bisphenol A, epoxidized fluorenonebisphenols and/or polyepoxides on the basis of bisphenol F, on the basis of triglycidyl isocyanurates and/or epoxidized novolaks, and at least one component accelerating the curing of the resin, is applied to the reinforcement; subsequently the reinforcement coated with the mixture 1 is subjected to a heat treatment, and so the mixture 1 is fixed on the surface of the reinforcement by melting; and thereafter a mixture 2 is applied to the reinforcement coated with the fixed mixture 1, the mixture 2 comprising at least one resin selected from the group consisting of polyepoxides on the basis of bisphenol A and/or F and/or advancement resins prepared therefrom, on the basis of tetraglycidylmethylenediamine, on the basis of epoxidized fluorenonebisphenols and/or epoxidized novolaks and/or polyepoxide esters on the basis of phthalic acid, hexahydrophthalic acid or on the basis of terephthalic acid, epoxidized o- or p-aminophenols, epoxidized polyaddition products of dicyclopentadiene and phenol, and at least one anhydride curative and/or amine curative, and this assembly is cured with heating.

This method makes it possible generally to do without a mixing and metering device, thereby saving on costs of acquisition, operation, and maintenance. Moreover, the procedure is independent, in terms of time, from processing parameters. It is now possible to combine long processing times with a short curing time, thus entailing a massive time saving for the coating of the reinforcements. Both mixture 1 and mixture 2 can be prepared in large quantities, and the storage-stability of the mixtures means that they do not have to be mixed in situ. A further advantage of the method is that compositions which are more uniform in terms of quality are achieved on the reinforcement. This is because it has been found that the heating during the curing procedure releases the accelerating component, and this entails high reactivity of the component when the composition is prepared. This in turn ensures a targeted onset of curing, and this has qualitative consequences for the homogeneity and hence for the properties for the composition.

As already mentioned at the outset, the reinforcement, made of glass, ceramic, boron, carbon, basalt and/or synthetic and/or natural polymers, in the form of fibers, scrims, nonwovens, knits or wovens, is coated with the mixture 1. For this purpose, the mixture 1 is prepared in conventional mixing assemblies, such as in an internal mixer, for example. 50% to 95% by weight of at least one resin of the mixture 1 are mixed substantially homogeneously with 5% to 50% by weight of the accelerating component. Examples of accelerating components employed include imidazoles, substituted imidazoles, imidazole adducts, imidazole complexes (e.g., Ni-imidazole complex), tertiary amines, quaternary ammonium or phosphonium compounds, tin(IV) chloride, dicyandiamide, salicylic acid, urea, urea derivatives or boron trifluoride complexes. The mixture 1 is ejected from the mixing assembly and stored if desired, the storability amounting to >1 year at temperatures <30° C., and is transported if desired. The mixture 1 can then be applied conventionally to the reinforcement, by means, for example, of spraying, spreading, knifecoating or by means of an infusion technique. Application by scattering is preferred, since the material already per se is a powder and hence can be used without complication. It is preferred if the mixture 1 is applied 1 mg to 10 mg per $cm^2$ of reinforcement. In this range, the coated reinforcement remains amenable to handling. If more than 10 mg of mixture 1 per $cm^2$ of reinforcement are applied, then the risk is run of the coating breaking off. If less than 1 mg per $cm^2$ is applied, the accelerator fraction is too small and the processing time is prolonged accordingly. This assembly is subjected thereafter to a temperature treatment. This treatment is carried out in a temperature range of 40-150° C. in, for example, a continuous oven, a continuous microwave oven or else preferably, on account of its efficiency, by means of induction heating. Mixture 1 is in a state in which it is melted substantially homogeneously and present in a uniform layer thickness on the reinforcement.

After storage if desired, the reinforcement coated with mixture 1 in this way is rolled up to save space and/or preshaped and/or transported and is coated with the mixture 2. The mixture 2 may be prepared as already described for mixture 1. The mixture 2, based on the mass of all of the components of the mixture 2, comprises 30% to 70% by weight of resin and 30% to 70% by weight of anhydride curative or amine curative or mixtures thereof. Anhydride curatives are preferred, since they can be provided as a one-component system, meaning that there is no need for a mixing and metering unit.

Of the mixture 2, preferably 10 mg to 100 mg per $cm^2$ of reinforcement are applied, and this has beneficial consequences for the mechanical strength of the reinforcement. Mixture 2 may likewise be applied by scattering, spraying, spreading, knifecoating or by means of an infusion technique. The composition is cured in a temperature range of 40-200° C., preferably 80-120° C.

The infusion technique is particularly preferred for the application of the mixture 2. By means of an applied underpressure, the liquid mixture is applied by suction to the reinforcement. It is therefore able to penetrate the reinforcement, and homogeneous coating quality is ensured in this way.

It is possible, furthermore, for the mixture 1 and/or 2 to comprise further additives such as, for example, graphite powders, siloxanes, pigments, metals (e.g., aluminum, iron or copper) in powder form, preferably particle size<100 μm, or metal oxides (e.g., iron oxide), reactive diluents (e.g., glycidyl ethers based on fatty alcohols, butanediol, hexanediol, polyglycols, ethylhexanol, neopentylglycol, glycerol, trimethylolpropane, castor oil, phenol, cresol, p-tert-butylphenol), UV protectants or processing assistants. These additives are added, based on the mixture 1, in a concentration of up to 2% by weight and, based on the mixture 2, of up to 15% by weight. On account of their conductivity, the use of graphite, metals or metal oxides allows the inductive heating of the mixture in question, hence producing a significant reduction in curing time. Siloxanes have an effect on improved impregnation and fiber attachment, leading ultimately to a reduction in defect sites in the assembly. Moreover, siloxanes have an accelerating effect in the infusion process. In summary it may be stated that these additives serve as processing assistants and/or for stabilizing the mixtures or as colorants.

The coated reinforcements of the invention are used preferably for producing rotor blades for wind turbines, or else for providing components in aircraft and vehicle technology, in automobile construction, and in marine construction. In these sectors in particular, there is a need to provide components of large surface area, which can now be produced in a way which is advantageous from the standpoint of processing technology.

EXAMPLE

The invention will be illustrated in more detail by reference to a working example.
a) Coating of the Reinforcement with Mixture 1:
  20 g of a solid epoxy resin (Epikote® 1004—product available from Hexion Specialty Chemicals Inc.) are first of all ground to a powder. 5 g of undecanesubstituted imidazole (Curazol C11Z—product available from Shikoku Chemicals Corp.) are added and homogenized by further grinding. The resultant mixture 1 is scattered onto a glass filament woven 92115 (from Lange+Ritter), and so the glass filament woven is covered with the mixture 1 at a concentration of 2 $mg/cm^2$ of glass filament woven. This assembly is placed in an induction oven at 70° C. for 15 minutes. After this time, the mixture 1 has melted onto the glass filament woven.
b) Coating of the Reinforcement Coated with Mixture 1 with Mixture 2:
  4.5 g of the glass filament woven coated with the mixture 1 are impregnated by means of a conventional infusion technique with 5.5 g (39.3 $mg/cm^2$) (Epikote® 03957—mixture of bisphenol A diglycidyl ether and hexahydrophthalic anhydride; product available from Hexion Specialty Chemicals, Inc.):
  The dry glass filament woven is placed in a mold which is coated with release agent. The woven is covered with a release woven or film which facilitates the uniform flow of the resin mixture (mixture 2). The film is sealed with respect to the mold by the application of a sealing strip, and the woven is evacuated by means of a vacuum pump (rotary slide pump). The mixture 2 is then pressed into the woven as a result of the prevailing underpressure. When the woven is fully impregnated with mixture 2, the assembly is cured by supply of heat (8 hours at 80° C. in the oven),
  or
  5.4 g of the glass filament woven coated with the mixture 1 are impregnated as just described above with 6 g (35.8 $mg/cm^2$) of a mixture of 100 parts (Epikote® 845—mixture of bisphenol A diglycidyl ether, bisphenol F diglycidyl ether and polypropylene glycol; product available from Hexion Specialty Chemicals, Inc.) and 82 parts (Epikure® 845—mixture of methyltetrahydrophthalic anhydride and reaction product of tetrahydrophthalic anhydride and neopentyl glycol: product available from Hexion Specialty Chemicals, Inc.). The assembly thus obtained is cured for 10 hours at 80° C. in the oven.

The cited working example is carried out on the laboratory scale and has been confirmed by means of industrial trials.

A coated reinforcement is obtained which in comparison to conventional methods can be provided in a cost-effective way on account of its processing-related optimization. The reduction in operating times (reduction by up to 50%) leads to a significant increase in the productivity, on the basis of the molds that are required.

I claim:

1. A method for producing a coated reinforcement whose surface has a coating of a heat-curable composition, comprising:
    applying to a reinforcement a first mixture comprising at least one resin selected from the group consisting of epoxidized phenol novolaks, epoxidized cresol novolaks, polyepoxides on the basis of bisphenol A, epoxidized fluorenonebisphenols, polyepoxides on the basis of bisphenol F, epoxy resins on the basis of triglycidyl isocyanurates, epoxidized novolaks and combinations thereof, and at least one accelerating component for the curing of the resin;
    subsequently subjecting the reinforcement coated with the first mixture to a heat treatment so that the first mixture is fixed on the surface of the reinforcement by melting;
    thereafter applying a second mixture to the reinforcement coated with the fixed first mixture, wherein the second mixture comprises at least one resin selected from the group consisting of polyepoxides on the basis of bisphenol A or bisphenol F, or on advancement resins prepared therefrom, on the basis of tetraglycidylmethylenediamine, on the basis of epoxidized fluorenonebisphenols, epoxidized novolaks, polyepoxide esters on the basis of phthalic acid, hexahydrophthalic acid or terephthalic acid, epoxidized o- or p-aminophenols, epoxidized polyaddition products of dicyclopentadiene and phenol, and combinations thereof, and at least one anhydride curative or amine curative, to form an assembly, wherein the amine curative is selected from aliphatic polyamines, cycloaliphatic polyamines, aromatic polyamines, polyamides, Mannich bases, polyaminoimidazolines, polyetheramines, and mixtures thereof; and
    curing the assembly with heat.

2. The method of claim 1, wherein the accelerating component is selected from an imidazole, substituted imidazole, imidazole adducts, imidazole complexes, tertiary amines, quaternary ammonium or phosphonium compounds, tin(IV) chloride, dicyandiamide, salicylic acid, urea, urea derivatives, boron trifluoride complexes, boron trichloride complexes, epoxy addition reaction products, tetraphenylene-boron complexes, amine borates, amine titanates, metal acetylacetonates, naphthenic metal salts, octanoic metal salts, tin octoates, metal salts, metal chelates and combinations thereof.

3. The method of claim 1 wherein the curative in the second mixture comprises a dicarboxylic anhydride or a modified dicarboxylic anhydride.

4. The method of claim 3 wherein the dicarboxylic anhydride or the modified dicarboxylic anhydride is selected from the group consisting of tetrahydrophthalic anhydride (THPA), hexahydrophthalic anhydride (HHPA), methyltetrahydrophthalic anhydride (MTHPA), methylhexahydrophthalic anhydride (MHHPA), methylnadic anhydride (MNA), dodecenylsuccinic anhydride (DSA) or mixtures thereof.

5. The method of claim 1 wherein the first mixture or the second mixture is applied by an infusion technique to the reinforcement.

6. The method of claim 1 wherein the reinforcement is in the form of fibers, scrims, nonwovens, knits or wovens.

7. The method of claim 1 wherein the reinforcement comprises glass, ceramic, boron, carbon, basalt, synthetic polymers or natural polymers.

8. The method of claim 1 wherein the first mixture comprises, based on the mass of all of the components, 50% to 95% by weight of resin and 5% to 50% by weight of accelerating component.

9. The method of claim 1 wherein the second mixture comprises, based on the mass of all of the components, 30% to 70% by weight of resin and 30% to 70% by weight of anhydride curative or amine curative or mixtures thereof.

10. The method of claim 1 wherein the first mixture is applied from 1 mg to 10 mg per $cm^2$ of reinforcement.

11. The method of claim 1 wherein the second mixture is applied from 10 mg to 100 mg per $cm^2$ of reinforcement.

12. The method of claim 1 wherein the first mixture or the second mixture further includes an additive comprising graphite powders, siloxanes, pigments, metals or metal oxides, reactive diluents, processing assistants or UV protectants.

* * * * *